United States Patent
Kato

(10) Patent No.: US 8,478,333 B2
(45) Date of Patent: Jul. 2, 2013

(54) MOVEMENT HISTORY REFERENCE SYSTEM, MOVEMENT INFORMATION REGISTRATION SERVER, INFORMATION COLLECTION SERVER, MOVEMENT HISTORY REFERENCE METHOD AND PROGRAM

(75) Inventor: Ayako Kato, Tokyo (JP)

(73) Assignee: NEC Corporation, Tokyo (JP)

(*) Notice: Subject to any disclaimer, the term of this patent is extended or adjusted under 35 U.S.C. 154(b) by 366 days.

(21) Appl. No.: 12/935,036

(22) PCT Filed: Apr. 9, 2009

(86) PCT No.: PCT/JP2009/057252
§ 371 (c)(1),
(2), (4) Date: Sep. 28, 2010

(87) PCT Pub. No.: WO2009/125812
PCT Pub. Date: Oct. 15, 2009

(65) Prior Publication Data
US 2011/0028164 A1    Feb. 3, 2011

(30) Foreign Application Priority Data

Apr. 11, 2008 (JP) ................................. 2008-103915

(51) Int. Cl.
*H04Q 7/20*        (2006.01)
(52) U.S. Cl.
USPC .............. 455/550.1; 455/435.1; 455/432.1; 455/456.3; 455/456.1; 455/456.5; 370/310; 370/328; 370/329; 370/338; 370/343
(58) Field of Classification Search
USPC ............. 455/550.1, 575.1, 445, 432.1–432.3, 455/433, 435.1–435.3, 422.1, 403, 414.1–414.4, 455/426.1, 426.2, 412.1, 412.2, 500, 517, 507, 514, 456.1–457; 370/310, 328, 329, 370/338, 343
See application file for complete search history.

(56) References Cited

U.S. PATENT DOCUMENTS

2009/0098821 A1*  4/2009  Shinya ......................... 455/3.01

FOREIGN PATENT DOCUMENTS

| JP | H11083531 A  | 3/1999  |
| JP | 2002209245 A | 7/2002  |
| JP | 2002229884 A | 8/2002  |
| JP | 2002342367 A | 11/2002 |
| JP | 2003259423 A | 9/2003  |

(Continued)

OTHER PUBLICATIONS

Japanese Office Action for JP2010-507270 mailed on Sep. 11, 2012.

*Primary Examiner* — Keith Ferguson

(57) ABSTRACT

A movement history reference system includes: a base station communicating with a first terminal; and a movement information registration server and an information collection server connected mutually to the base station. The movement information registration server includes: a first storage unit that stores the movement history; and a movement history recording unit that acquires positional information of the first terminal from the base station, and requests the information collection server to retrieve an address corresponding to the positional information and additional information related to the address. The information collection server includes: a second storage unit that stores address data that is a list of addresses corresponding to the positional information; and a data retrieval unit that retrieves an address corresponding to the positional information from the address data, retrieves additional information related to the address, and returns the acquired address and additional information to the movement information registration server.

14 Claims, 11 Drawing Sheets

FOREIGN PATENT DOCUMENTS

| | | |
|---|---|---|
| JP | 2004252964 A | 9/2004 |
| JP | 2005352817 A | 12/2005 |
| JP | 2006080843 A | 3/2006 |
| JP | 2006166421 A | 6/2006 |
| JP | 2006251938 A | 9/2006 |
| JP | 2007274389 A | 10/2007 |
| JP | 2008021045 A | 1/2008 |
| WO | 03003773 A1 | 1/2003 |

* cited by examiner

FIG.2

| 50 | 51 | 52 | 53 | 54 | 55 | 56 | 57 | 58 |
|---|---|---|---|---|---|---|---|---|
| | UE IDENTIFICATION NUMBER | TIME INFORMATION | LONGITUDE | LATITUDE | ADDRESS | ADDITIONAL INFORMATION | AREA | STAY TIME |
| | TERMINAL 20a | 2008/4/7 20:31 | E135.67.89 | N35.21.11 | 1-2-3, ○○, ○○CITY, ○○STATE | ××RESTAURANT | A-1 | 1:55:01 |
| | TERMINAL 20a | 2008/4/8 12:03 | E135.77.44 | N35.33.66 | 4-5-6, □□, □□CITY, □□STATE | ○○STORE | A-1 | 1:25:51 |
| | TERMINAL 20a | 2008/4/9 18:59 | E135.74.21 | N35.27.90 | 7-8-9, △△, △△CITY, △△STATE | ○○EXHIBITION | A-1 | 0:13:25 |
| | TERMINAL 20a | 2008/4/11 8:48 | E135.71.00 | N34.99.88 | 101, ××, ××TOWN, ××COUNTY, ××STATE | △△BUILDING | A-1 | 9:11:47 |
| | ... | ... | ... | ... | ... | ... | ... | ... |

FIG.3

| UE IDENTIFICATION NUMBER | DAILY LONGITUDE | DAILY LATITUDE |
|---|---|---|
| TERMINAL 20a | E135.69.96 | N35.44.44 |
| TERMINAL 20a | E135.65.11 | N35.35.35 |
| ... | ... | ... |

FIG.4

| | LONGITUDE | LATITUDE | ADDRESS | AREA |
|---|---|---|---|---|
| | 53 | 54 | 55 | 57 |
| | E135.67.89 | N35.21.11 | 1-2-3, OO, OOCITY, OOSTATE | A-1 |
| | E135.67.90 | N35.21.11 | 1-2-4, OO, OOCITY, OOSTATE | A-2 |
| | E135.67.91 | N35.21.11 | 1-2-5, OO, OOCITY, OOSTATE | B-1 |
| | E135.67.92 | N35.21.11 | 1-2-6, OO, OOCITY, OOSTATE | A-1 |

70

(CONTINUE TO PROCESSING OF
STEP S104 IN FIG. 5 AND THEREAFTER)

(CONTINUE TO PROCESSING OF STEP S204 IN FIG. 6 AND THEREAFTER)

MOVEMENT HISTORY REFERENCE SYSTEM, MOVEMENT INFORMATION REGISTRATION SERVER, INFORMATION COLLECTION SERVER, MOVEMENT HISTORY REFERENCE METHOD AND PROGRAM

This application is the National Phase of PCT/JP2009/057252, filed Apr. 9, 2009, which claims the Priority right based on Japanese Patent Application No. 2008-103915 filed on Apr. 11, 2008, and the disclosure thereof is hereby incorporated by reference in its entirety.

TECHNICAL FIELD

The present invention relates to a system and the like which conducts recording and makes reference of movement history of terminals such as mobile phones in a radio communication network. More specifically, the present invention relates to a system and the like which conducts recording and makes reference of additional information of the movement history at each point.

BACKGROUND ART

Terminals such as mobile phones in radio communication networks have been spread so much that it is no exaggeration to say that every single person owns a terminal. Among those terminals, there are types that have a function of referring to own position by GPS (Global Positioning System). Therefore, there has been a demand for a service that is capable of recording and making reference to not only the current position but also the own movement history in a specific period and area or the movement history of others (family members, for example).

As techniques for achieving such service, there are following technical documents. Patent Document 1 discloses a technique with which a terminal receives signals from a GPS satellite and signals from a base station, and specifies the address of the terminal and the like from the positional information calculated based on the both signals. Patent Document 2 discloses a technique which retrieves address information from positional information acquired by a terminal, and distributes it to the terminal by adding advertisements thereto. Patent Document 3 discloses a technique which records the history of positional information of a terminal to a server. Patent Document 4 discloses a technique which judges whether or not a current position of a user is an exception in regards to daily behaviors based on the movement history of the user.

Patent Document 1: Japanese Unexamined Patent Publication 2002-209245
Patent Document 2: Japanese Unexamined Patent Publication 2002-229884
Patent Document 3: Japanese Unexamined Patent Publication 2003-259423
Patent Document 4: Japanese Unexamined Patent Publication 2006-251938

BRIEF DESCRIPTION OF THE DRAWINGS

FIG. 2 is a conceptual chart showing a data structure of movement history shown in FIG. 1;
FIG. 3 is a conceptual chart showing a data structure of daily information shown in FIG. 1;
FIG. 4 is a conceptual chart showing a data structure of address data shown in FIG. 1.

DISCLOSURE OF THE INVENTION

Figure 1:
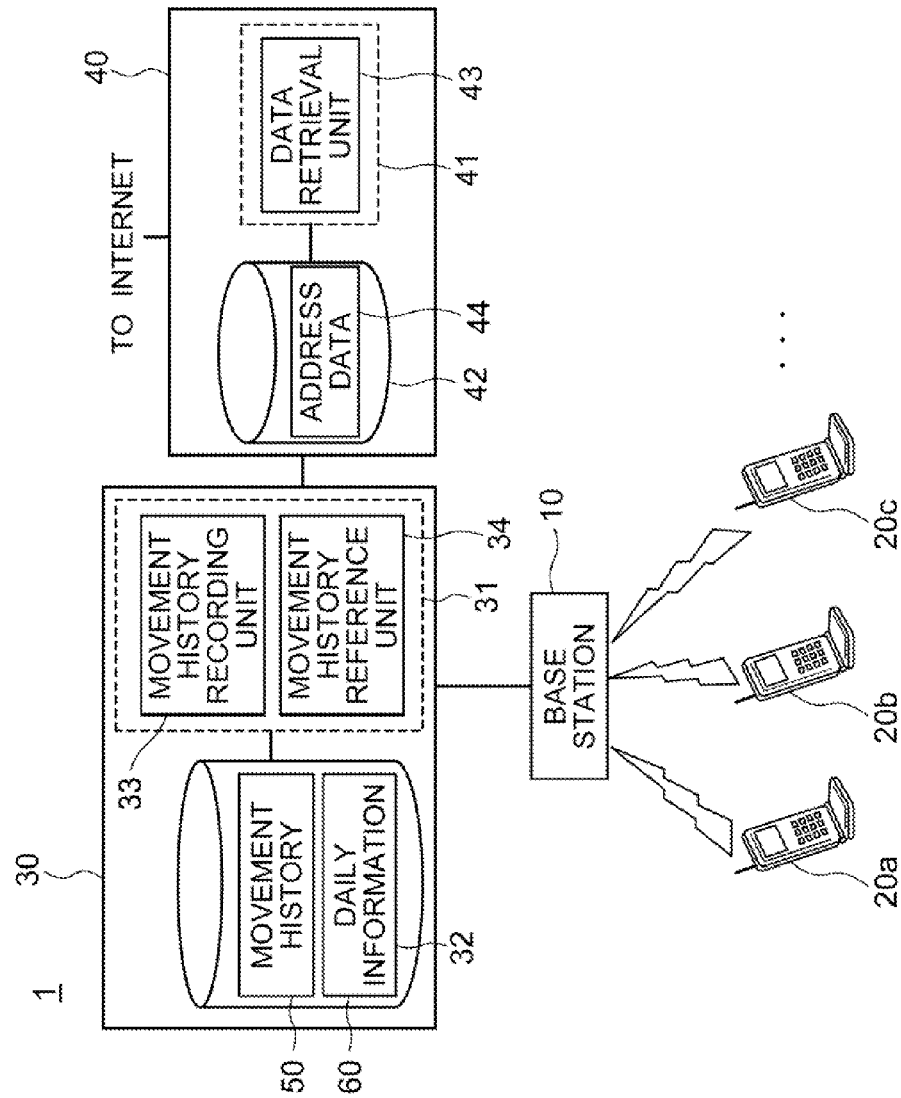
FIG. 1 is an image chart showing the structure of a radio communication network according to a first embodiment of the present invention.

Problems to be Solved by the Invention

By combining the above-described Patent Documents, particularly Patent Documents 1-3, it is possible to acquire a technique that is capable of specifying the address from the positional information acquired by a mobile phone, and records it to a server to record the movement history of the user. However, there are cases where such technique alone is not sufficient.

The address can be specified from the positional information. However, a structure that is capable of acquiring additional information corresponding to that address (e.g., name of the building, name of the event) is not disclosed in Patent Documents 1-4. For example, there are actually many cases where the name of the building is changed from the point at which the positional information is recorded to the server or where the positional information is recorded during a temporary event. If the data for acquiring the address information based on the positional information is not the latest data in such cases, it is only the address information that is acquired based on old data. Thus, it may become difficult to reach that place.

An object of the present invention is to provide a movement history reference system, a movement information registration server, an information collection server, and a movement history reference method and program, with which a user can refer to the movement history including additional information based on the latest data.

Means for Solving the Problem

In order to achieve the foregoing object, the movement history reference system according to the present invention is characterized as a movement history reference system capable of recording and referring to movement history of a first terminal, which is structured with a base station communicating with the first terminal and a movement information registration server as well as an information collection server connected mutually to the base station. The movement information registration server includes a first storage unit that stores the movement history, and a movement history recording unit that acquires positional information of the first terminal from the base station, and requests the information collection server to retrieve an address corresponding to the positional information and additional information related to the address; and the information collection server includes a second storage unit that stores address data that is a list of addresses corresponding to the positional information, and a data retrieval unit that retrieves an address corresponding to the positional information from the address data, retrieves additional information related to the address, and returns the acquired address and additional information to the movement information registration server.

In order to achieve the foregoing object, the movement information registration server according to the present invention is characterized as a movement information registration server which configures a movement history reference system by being mutually connected to an information collection server and a base station that communicates with a first terminal. The movement information registration server includes: a storage unit that stores movement history of the first terminal; and a movement history recording unit that acquires positional information of the first terminal from the base station, and requests the information collection server to retrieve an address corresponding to the positional information and additional information related to the address.

In order to achieve the foregoing object, the information collection server according to the present invention is characterized as an information collection server which configures a movement history reference system by being mutually connected to a movement information registration server and a base station that communicates with a terminal. The information collection server includes: a storage unit that stores address data that is a list of addresses corresponding to positional information; and a data retrieval unit that retrieves an address corresponding to the positional information received from the movement information registration server from the address data, retrieves additional information related to the address, and returns the acquired address and additional information to the movement information registration server.

In order to achieve the foregoing object, the movement history reference method according to the present invention is characterized as a movement history reference method capable of recording and making reference to movement history of a terminal in a radio communication network that is formed with a base station communicating with the terminal and a movement information registration server as well as an information collection server connected mutually to the base station. The method includes: acquiring positional information of the terminal from the base station and requesting the information collection server to retrieve an address corresponding to the positional information and additional information related to the address by using the movement information registration server; retrieving the address corresponding to the positional information from address data stored in itself and retrieving the additional information related to the address by using the information collection server; and returning the retrieved address and additional information to the movement information registration server by using the information collection server.

In order to achieve the foregoing object, the movement history reference program according to the present invention is characterized as a movement history reference program that causes a computer, which is a movement information registration server that configures a movement history reference system by being mutually connected to an information collection server and a base station that communicates with a terminal, to execute: positional information acquiring processing that acquires positional information of the terminal from the base station; and retrieval request processing that requests the information collection server to retrieve an address corresponding to the positional information and additional information related to the address.

In order to achieve the foregoing object, another movement history reference program according to the present invention is characterized as a movement history reference program that causes a computer, which is an information collection server that configures a movement history reference system by being mutually connected to a movement information registration server and a base station that communicates with a terminal, to execute: a function of retrieving an address corresponding to the positional information received from the movement information registration server from address data that is stored in itself; a function of retrieving additional information related to the address; and a function of returning the address and the additional information acquired by the address retrieval processing and the additional information retrieval processing to the movement information registration server.

Effects of the Invention

The present invention includes the information collection server that retrieves additional information related to the address. Thus, it is possible to acquire the latest address and positional information corresponding to the positional information that is acquired from the base station by the movement information registration server, and to save the address and the positional information. Thereby, the user can refer to the movement history including the additional information based on the latest data.

BEST MODES FOR CARRYING OUT THE INVENTION

Hereinafter, embodiments of the present invention will be described in details by referring to the drawings.

First Embodiment

FIG. 1 is an image chart showing the structure of a radio communication network 1 according to a first embodiment of the present invention. The radio communication network 1 includes a base station 10, a plurality of terminals 20a, 20b, - - - as UE (user entity), a movement information registration server 30, and an information collection server 40.

The base station 10 communicates with terminals 20a, 20b, and the like. There may be a plurality of base stations 10 in the radio communication network 1. In this embodiment, the terminals 20a, 20b, - - - do not necessarily have a GPS function. Thus, positions of the terminals 20a and 20b are calculated by the base station 10 based on information regarding own communicable range.

The movement information registration server 30 requests positional information and time information of the terminals 20a, 20b, - - - to the base station 10, and saves the positional information and the time information returned from the base station 10 as movement history 50. The action of the movement information registration server 30 for requesting the positional information and the time information to the base station 10 is conducted regularly at a prescribed interval. Further, the movement information registration server 30 returns the contents saved in the movement history 50 to the terminal according to the request from the terminals 20a, 20b, - - - . Further, the movement information registration server 30 also stores daily information 60 that is described later.

The movement information registration server 30 includes each of functional units such as a processing unit 31, a storage unit 32, a movement history recording unit 33, and a movement history reference unit 34. The processing unit 31 is a center part of a computer device including a CPU, a RAM, and an OS, and executes application software. The storage unit 32 stores the movement history 50 and the daily information 60 to be described later. The movement history recording unit 33 and the movement history reference unit 34 are applications executed by the processing unit 31. The movement history recording unit 33 records the movement history 50 by executing processing that is to be described later, and the movement history reference unit 34 refers to data of the movement history 50 by executing processing that is to be described later.

The information collection server 40 collects additional information to be described later and returns the result to the movement information registration server 30 according to a request from the movement information registration server 30. As in the case of the movement information registration server 30, the information collection server 40 includes a processing unit 41, a storage unit 42, and a data retrieval unit 43. The processing unit 41 is a center part of a computer device including a CPU, a RAM, and an OS, and executes application software. The storage unit 42 includes address data 44 that is a list in which longitudes and latitudes are corresponded to addresses and areas thereof. The data retrieval unit 43 retrieves an address and additional information from the positional information transmitted from the movement information server 30 by executing processing that is to be described later.

The movement information registration server 30 saves the information collected by the information collection server 40 by including it in the movement history 50. The information collection server 40 and the movement information registration server 30 may be structured by a physically same computer or may be structured by separate computers.

It is true that it is desirable to form the movement history recording unit 33, the movement history reference unit 34, and the data retrieval unit 43 as a program for causing the computer device to execute actions described later. However, the present invention is not limited only to that.

FIG. 2 is a conceptual chart showing a data structure of the movement history 50 shown in FIG. 1. The movement history 50 includes information such as a UE identification number LO 51, time information 52, longitude 53, latitude 54, an address 55, additional information 56, an area 57, and stay time 58. The UE identification number 51, the time information 52, the longitude 53, and the latitude 54 are information calculated by the base station 10. The address 55, the additional information 56, and the area 57 are information acquired by the information collection server 40 based on the longitude 53, the latitude 54, and the like. The stay time 58 is information added by the movement information registration server 30, and it will be described later in details.

FIG. 3 is a conceptual chart showing a data structure of the daily information 60 shown in FIG. 1. A terminal (assumed as the terminal 20a in this case) which receives a positional information reference service is registered to the service in advance, and the daily information 60 of the registered terminal 20a is stored in advance to the movement information registration server 30.

The daily information 60 is information showing the longitude and the latitude of a place that is considered to be a place the user is at daily, such as the home, the work place, or the school of the user that uses the terminal 20a. Hereinafter, the longitude and the latitude registered as the daily information 60 are called daily longitude 61 and daily latitude 62, respectively. A plurality of sets of daily longitudes 61 and daily latitudes 62 can be stored for a single terminal (UE identification number 51).

FIG. 4 is a conceptual chart showing a data structure of the address data 44 shown in FIG. 1. The address data 44 shows the longitude 53 and the latitude 54 within a range used by the service (e.g., whole land of Japan), and corresponding relations of the address 55 and the area 57 at a point shown by the longitude 53 and the latitude 54. Note here that the information regarding which address 55 corresponds to which area 57 can be determined in advance by a service provider or the user.

Figure 5:
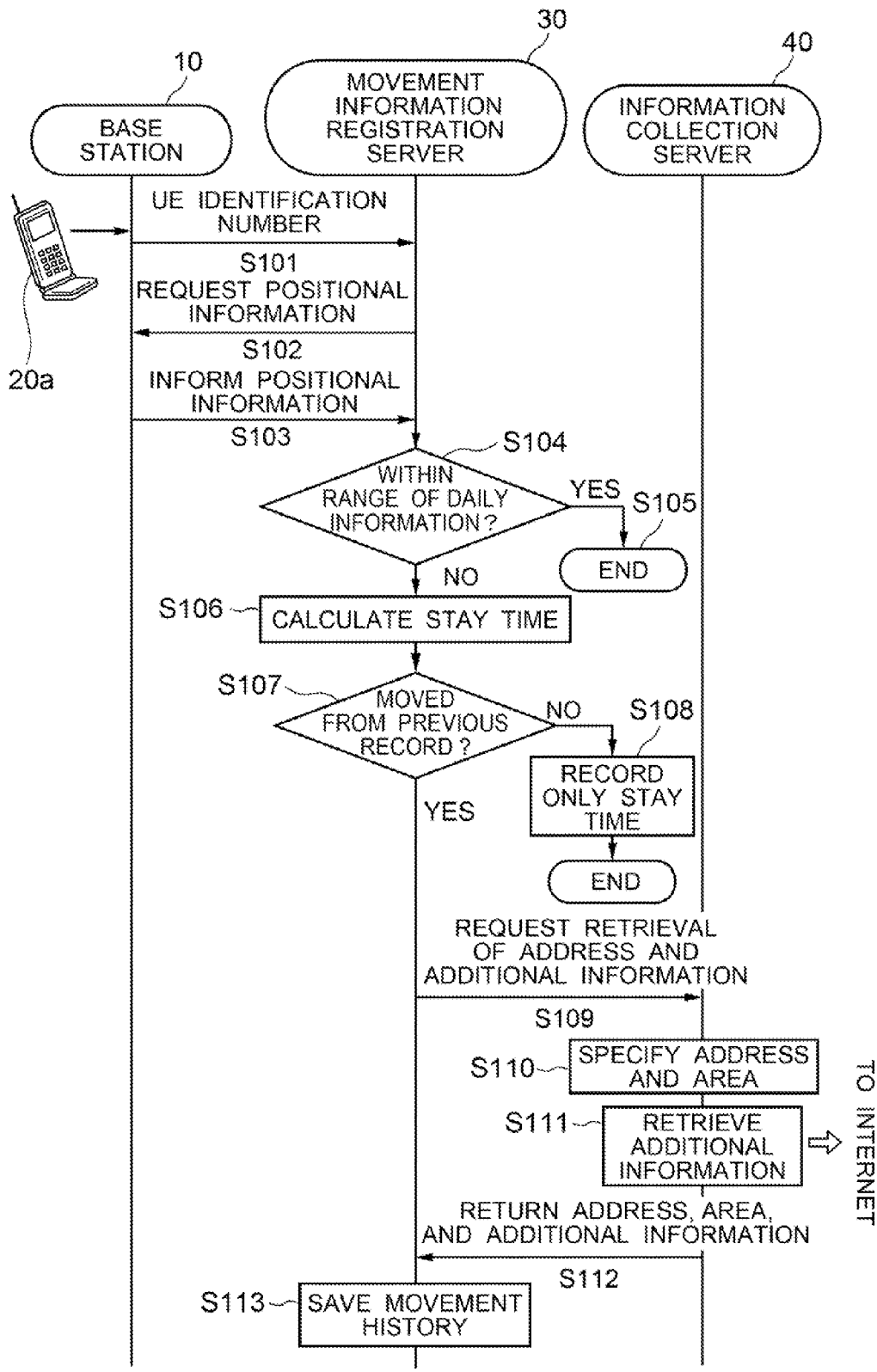
FIG. 5 is a flowchart showing processing regarding recoding of movement history executed among a base station, a movement information registration server, and an information collection server shown in FIG. 1.

FIG. 5 is a flowchart showing processing regarding recording of the movement history 50 executed among the base station 10, the movement information registration server 30 and the information collection server 40 shown in FIG. 1. The processing regarding the movement information registration server 30 is executed by the movement history recording unit 33, and the processing regarding the information collection server 40 is executed by the data retrieval unit 43.

When the terminal 20a enters a communicable range of the base station 10 and starts to communicate with the base station 10, the base station 10 reports the UE identification number 51 of the terminal 20a to the movement information registration server 30 (step S101).

The movement information registration server 30 requests the base station 10 regularly at a prescribed interval thereafter to transmit the positional information (the longitude 53 and the latitude 54) (step S102). In response, the base station 10 transmits the UE identification number 51 of the terminal 20a, the time information 52, the longitude 53, and the latitude 54 to the movement information registration server 30 (step S103). The time information 52 is the time of the point at which the processing is executed. Further, as described above, the terminals 20a, 20b, - - - do not necessarily have the GPS function. Thus, the longitude 53 and the latitude 54 are information that is calculated by the base station 10 based the own communicable range.

In response to receiving the UE identification number 51, the time information 52, the longitude 53, and the latitude 54 the base station 10, the movement information registration server 30 compares the longitude 53 and the latitude 54 with the daily longitude 61, and the daily latitude 62 registered as the daily information 60 which corresponds to the UE identification number 51 (step S104). The movement information registration server 30 shifts the processing to step S105 when the distance between a point shown by the longitude 53 and the latitude 54 and a point shown by the daily longitude 61 and the daily latitude 63 is within a prescribed threshold value, and shifts the processing to step S106 in other cases.

When a plurality of sets of daily longitudes 61 and daily latitudes 62 are registered as the daily information 60, the movement information registration server 30 compares all of those sets with the longitude 53 and the latitude 54, shifts the processing to step S107 when the distances with respect to the points shown by all the daily information 60 are equal to or larger than the prescribed threshold value, and shifts the processing to step S105 when there is even one set whose distance between the point shown by the longitude 53 and the latitude 54 and the point shown by the daily longitude 61 and the daily latitude 62 is equal to or less than the prescribed threshold value.

In a case where the processing is shifted to step S105, the user corresponding to the terminal 20a is considered to be within a range of places where the user may be at daily. Thus, it is not specifically necessary to save the behavioral history. Therefore, the movement information registration server 30 ends the processing there (step S105), and does not execute the processing of step S106 and thereafter. It is also possible to set so as not to execute the processing for making a comparison with the daily information 60 shown in steps S104-S105 based on the setting done by the user.

In a case where the processing is shifted to step S106, the user corresponding to the terminal 20a is considered to be at a place that is out of the range of the places where the user may be at daily. Thus, the movement information registration server 30 reads out the time information 52, the longitude 53, and the latitude 54 corresponding to the previously recorded UE identification number 51 (referred to as previous record hereinafter), and first compares the previously recorded time information 52 with the current time to calculate the stay time 58 that is the time for which the user stayed at that place (step S106).

Subsequently, the movement information registration server 30 compares the longitude 53 and the latitude 54 received from the base station 10 this time with the previously recorded ones (step S107). The movement information registration server 30 shifts the processing to step S108 when the distance between the point shown by the previously recorded longitude 53 and latitude 54 and the point shown by the longitude 53 and the latitude 54 of this time is equal to or less than the prescribed threshold value, and shifts the processing to step S109 in other cases.

In a case where the processing is shifted to step S108, it is considered that the user corresponding to the terminal 20a has not moved from the previous recording point. In this case, it is also not specifically necessary to save the behavioral history in this case. Thus, the movement information registration server 30 records only the stay time 58 calculated in step S106 to the preciously recorded record (step S108), and ends the processing there so that the processing of step S109 and thereafter is not executed. It is also possible to set so as not to execute the processing for making a comparison with the previous record shown in steps S107-108 according to the setting done by the user.

In a case where the processing is shifted to step S109, it is considered that the user corresponding to the terminal 20a is at a place out of the range of the places the user may be at daily and has moved from the previous recording point. In that case, the movement information registration server 30 transfers the UE identification number 51, the time information 52, the longitude 53, and the latitude 54 received from the base station 10 this time to the information collection server 40 to request retrieval of the address of that point and additional information regarding that point (step S109).

The information collection server 40 refers to the address data 44 from the longitude 53 and the latitude 54 received from the movement information registration server 30 to calculate the address 55 corresponding to the longitude 53 and the latitude 54, and the area 57 belonging to that address (step S110).

Further, the information collection server 40 retrieves the information regarding the address 55 that is calculated in step S110 via the Internet, and retrieves the additional information 56 for the address 55 (step S111). The additional information 56 retrieved herein is a name of the building at that address, a name of the event held at that address at a data shown in the time information 52, or the like.

The information collection server 40 returns the address 55, the additional information 56, and the area 57 acquired in steps S110-111 to the movement information registration server 30 (step S112). The movement information registration server 30 saves the time information 52, the longitude 53, the latitude 54, the address 55, the additional information 56, the area 57, and the stay time 58 acquired by the above-described processing in the movement history 50 by relating those to the UE identification number 51 (step S113). Note, however, that only the stay time 58 is recorded in the previously recorded record, and other data is recorded to a newly created record. The above-described processing is repeated at a prescribed interval as long as the terminal 20a stays within the communicable range of the base station 10.

Figure 6:
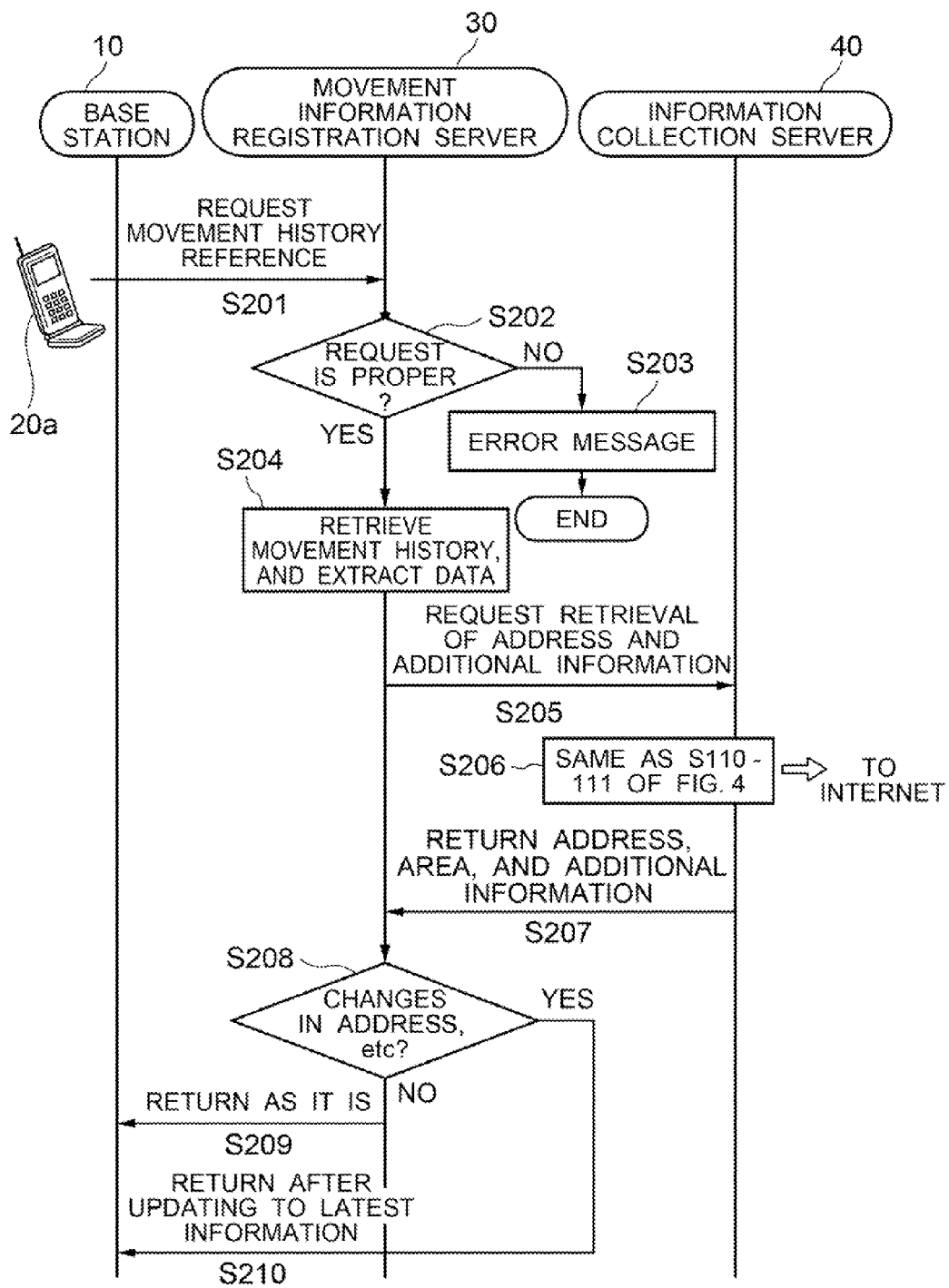
FIG. 6 is a flowchart showing the flow of processing that is executed among the base station, the movement information registration server, and the information collection server shown in FIG. 1 when there is a movement history reference request from a terminal.

FIG. 6 is a flowchart showing a flow of the processing that is executed when there is a movement history reference request made from the terminal 20a among the base station 10, the movement information registration server 30, and the information collection server 40 shown in FIG. 1. The processing regarding the movement information registration server 30 is executed by the movement history reference unit 34, and the processing regarding the information collection server 40 is executed by the data retrieval unit 34. It is assumed here that the terminal 20a is about to refer to the data regarding the own movement.

The base station 10 that has received the movement history reference request from the terminal 20a transfers the movement history reference request to the movement information registration server 30 (step S201). The movement history reference request contains the UE identification number 51 and information (request information) indicating desire to refer to the movement history of the terminal corresponding to the UE identification number 51. The request information contains at least either area information showing the zone whose information is desired to be referred or the date/time range whose information is desired to be referred.

The movement information registration server 30 that has received the movement history reference request from the base station 10 checks whether or not the request is proper (step S202). Note here that whether or not the request is "proper" means whether or not the UE identification number 51 as the target of the reference of the movement history is the same as that of the terminal 20a that is a transmitter of the movement history reference request in step S201. When those are the same, the movement information registration server 30 judges that it is a proper movement history reference request, and shifts the processing to step S204. When those are not the same, the movement information registration server 30 can end the processing there or may proceed to processing of a user authentication procedure that is described later. Here, the movement information registration server 30 issues an error message indicating "the movement history reference request is not proper" (step S203), and ends the processing.

When it is judged that the movement history reference request is proper, the movement information registration server 30 retrieves and extracts the corresponding data from the data recorded in the movement history 50 (step S204). When the area information is contained in the request information, the movement information registration server 30 extracts the data which corresponds to the target UE identification number 51 and is the area information whose area 57 is requested. When the date/time range is contained in the request information, the movement information registration server 30 extracts the data which corresponds to the target UE identification number 51 and is contained in the date/time range whose time information 52 is requested.

The movement information registration server 30 transfers the time information 52, the longitude 53, and the latitude 54 of the data extracted in step S204 to the information collection server 40, and requests retrieval of the address of the corresponding point and the additional information regarding that point (step S205). The information collection server 40 retrieves the address 55, of the corresponding point, the area 57, and the additional information 56 regarding that point in the same manner as that of steps S110-111 shown in FIG. 5 (step S206), and returns those to the movement information registration server 30 (step S207).

The movement information registration server 30 compares the address 55, the additional information 56, and the area 57 recorded in the data that is extracted in step S204 with the information returned from the movement information registration server 30 in step S207 (step S208), and returns the data extracted in step S204 to the base station 10 when those are the same (step S209). If those are not the same, the movement information registration server 30 updates the address 55 and the additional information 56 to the latest information that is returned from the movement information registration server 30, and returns it to the base station 10 (step S210). At that time, the movement information registration server 30 may also return the fact that there is a change in the address 55 and the additional information 56 to the base station 10 at the same time.

The base station 10 returns the information returned from the movement information registration server 30 to the terminal 20a (step S211), and ends the processing regarding the movement history reference request.

Figure 7:
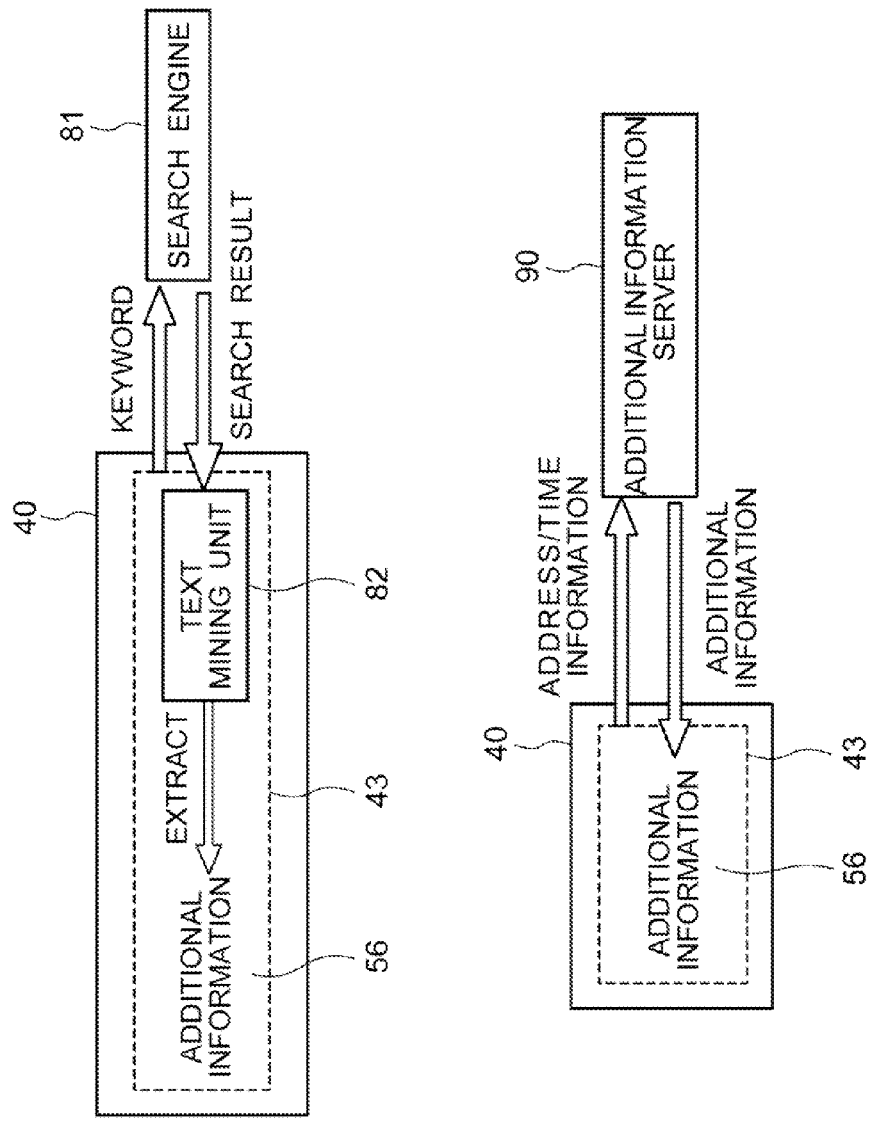
FIG. 7 is a conceptual chart showing retrieval of the additional information shown in step S111 of FIG. 5 and step S206 of FIG. 6 in more details.

FIG. 7 is a conceptual chart showing the retrieval of the additional information 56 shown in step S111 of FIG. 5 and step S206 of FIG. 6 in more details. As described above, the additional information 56 is a name of the building or the like corresponding to the address 55, a name of the event corresponding to the address 55 and the time information 52, and the like. As processing executed by the data retrieval unit 43 for acquiring those information, two methods are discussed herein.

With a first method shown in FIG. 7A, the data retrieval unit 43 conducts retrieval by using an arbitrary search engine 81 such as Google (registered trademark) targeted at web pages in general by having "address 55" or "address 55 and time information 52" as a keyword. Then, the data retrieval unit 43 extracts the name of the building, event, or the like from a list acquired by the retrieval and the contents of the web pages shown on the list by using a text mining module 82 included in the data retrieval unit 43, and returns it to the movement information registration server 30 as the additional information 56.

With a second method shown in FIG. 7B, the data retrieval unit 43 transmits the address 55 and the time information 52 to an additional information server 90 that is built separately from the radio communication network 1 via the Internet. The additional information server 90 is a server built exclusively for the positional information reference service according to the embodiment, and the latest data regarding the building, events, and the like is registered at all times. The additional information server 90 retrieves the additional information 56 corresponding to the address 55 and the time information 52 received from the data retrieval unit 43 from the data registered to itself, and returns it to the information collection server 40. The information collection server 40 returns it to the movement information registration server 30.

However, for the retrievals of the additional information 56, the methods are not limited only to those. For example, the information collection server 40 and the additional information server 90 may be structured with a physically same computer. Further, it is also possible to structure the additional information server 90 to have a same function as that of the text mining module 82 shown in FIG. 7A to update the own registration data with the information acquired from the web pages in general.

Figure 8:
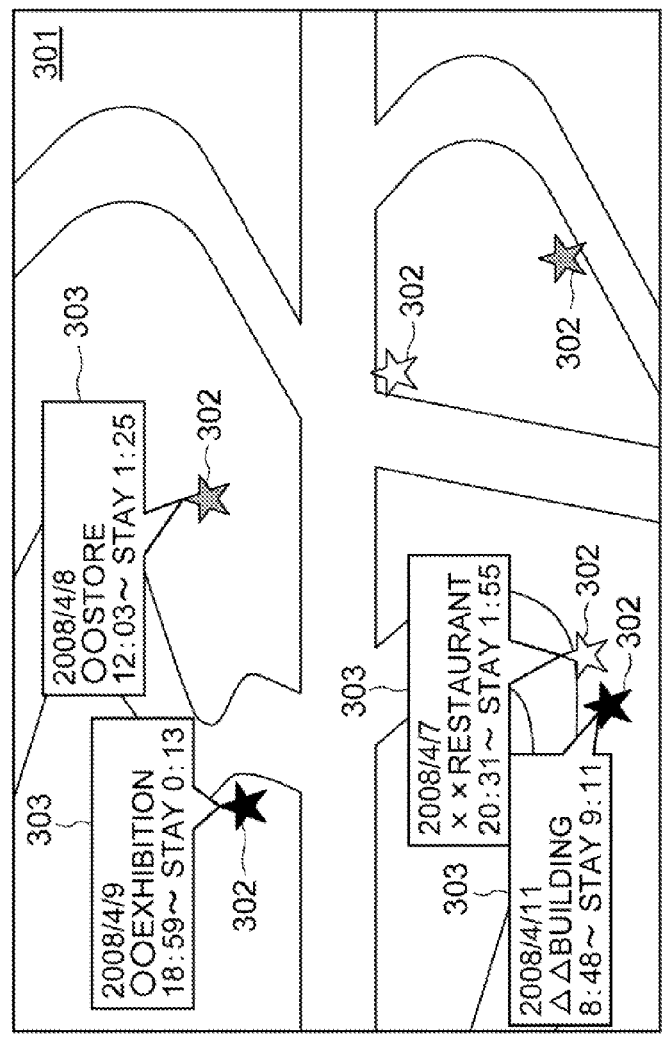
FIG. 8 is an image chart showing an example of the movement history displayed on the terminal as a result of executing processing shown in FIG. 6.

FIG. 8 is an image chart showing an example of the movement history displayed on the terminal 20a as a result of executing the processing shown in FIG. 6. A map 301 corresponding to the area 57 as the target of the movement history reference request is displayed on the terminal 20a as a background, the position corresponding to the longitude 53 and the latitude 54 is shown thereon with a mark 302, and further the time information 52, the additional information 56, and the stay time 58 are shown in balloons 303 which pointing at each of the marks 302.

The processing for creating an image acquired by placing the marks 302 and the balloons 303 on the map 301 may be executed by the terminal 20a or may also be executed by the base station 10 or the movement information registration server 30. Further, it is also possible to let the user select a record regarding a specific point or a specific date/time from the movement history shown in the image of FIG. 8 and cancel it from the movement history 50.

The above-described processing makes it possible to acquire the current address 55 and the additional information 56 regarding the place accurately even in a case where there is a change in the address, the name of the building or in a case where time of more than some extent has passed from the point at which an event that is held only temporarily is ended, for example.

Second Embodiment

The structure of apparatuses of a radio communication network according to a second embodiment of the present invention is the same as that of the radio communication network 1 according to the first embodiment, so that it is not specifically illustrated. Further, the data contents of the movement history 50 and the daily information 60 are the same as those shown in FIG. 2 and FIG. 3. However, the terminals 20a, 20b, - - - have the GPS function. Thus, the movement information registration server 30 executes the processing for recording the movement history 50 regarding the terminal 20a by referring the positional information to the terminal 20a for each time.

Figure 9:
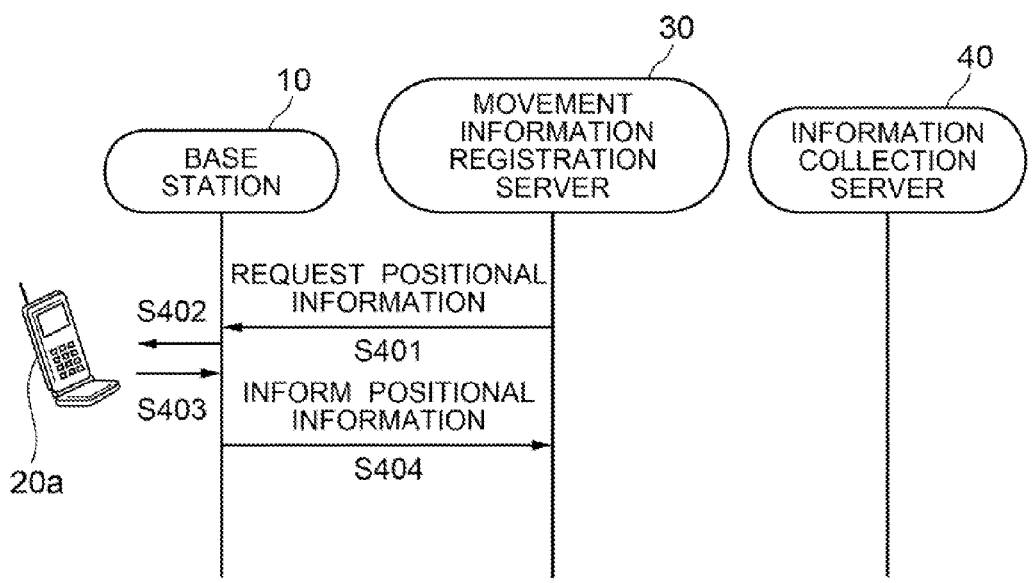
FIG. 9 is a flowchart showing processing regarding recoding of movement history executed among a base station, a movement information registration server, and an information collection server according to a second embodiment of the present invention.

FIG. 9 is a flowchart showing the flow of the processing regarding recording of the movement history 50 executed among the base station 10, the movement information registration server 30, and the information collection server 40 according to the second embodiment of the present invention. The movement information registration server 30 regularly requests the base station 10 to transmit the positional information (the longitude 53 and the latitude 54) regarding the UE identification number 51 (step S401). The base station 10 upon receiving the request from the movement information registration server 30 refers the positional information to the terminal 20a that corresponds to the UE identification number 51 (step S402).

The terminal 20a that has received a reference made by the base station 10 returns the own longitude 53 and latitude 54 to the base station 10 (step S403), and the base station 10 notifies the UE identification number 51 of the terminal 20a, the time information 52, and the longitude 53 as well as the latitude 54 received from the terminal 20a to the movement information registration server 30 (step S404). The time information 52 is the time at which the processing is executed. The processing thereafter is the same as the processing of step S104 and thereafter shown in FIG. 5, so that illustrations and explanations thereof are omitted.

The second embodiment makes it possible to acquire the positional information of the terminal 20a more accurately compared to that of the first embodiment. Further, while the base station 10 may not always know the positional information of the terminal 20a depending on the communication method employed between the base station 10 and the terminal 20a, it is possible to execute the processing according to the present invention even in such case. The processing regarding the movement history reference request and the processing regarding display of the movement history are the same as those of the first embodiment, so that those are not specifically explained herein.

Third Embodiment

Figure 10:
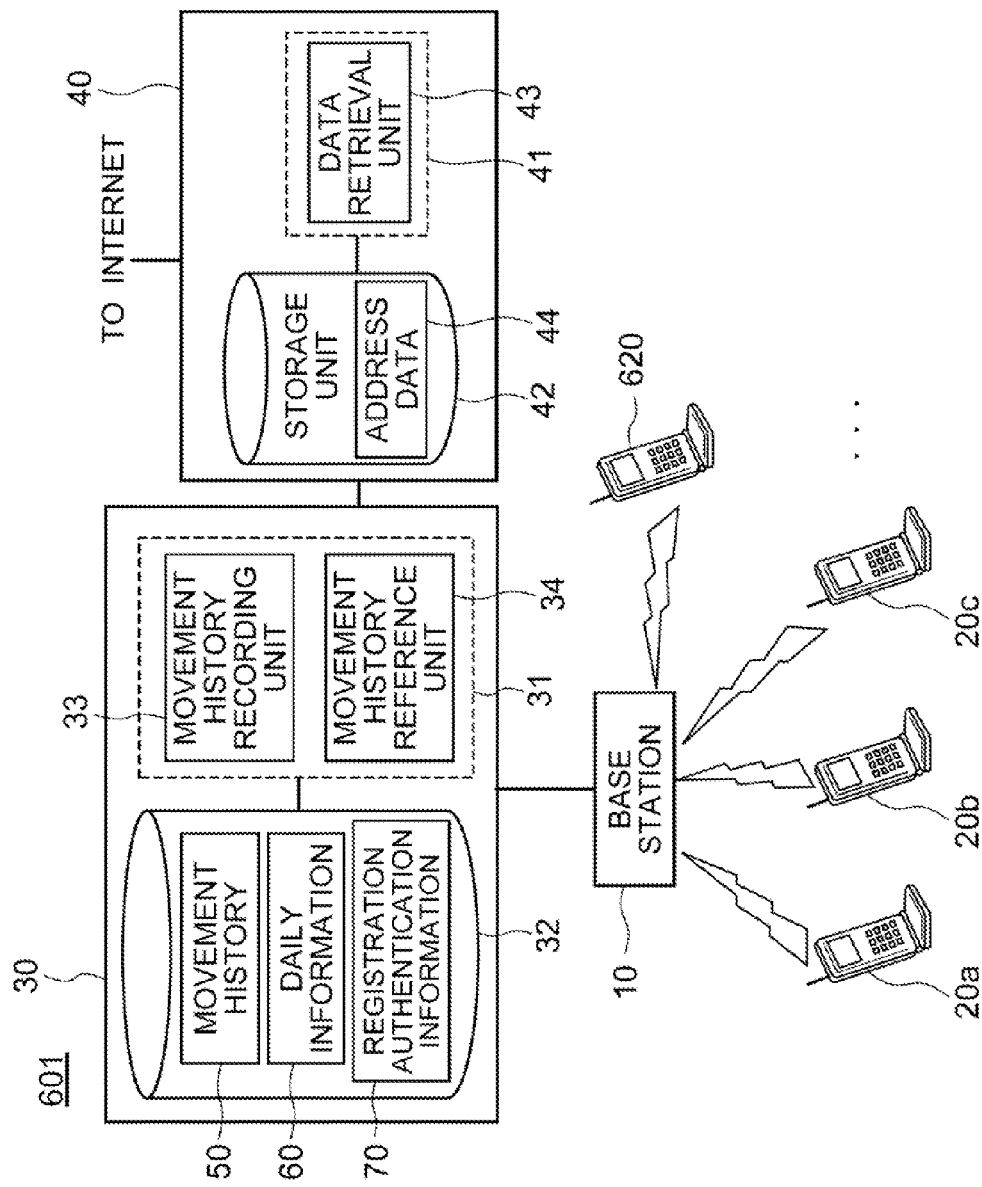
FIG. 10 is an image chart showing the structure of a radio communication network according to a third embodiment of the present invention.

FIG. 10 is an image chart showing the structure of a radio communication network 601 according to a third embodiment of the present invention. The radio communication network 601 according to the third embodiment of the present invention is structured to be able to transmit the movement history reference request of the terminal 20a from a terminal 620 other than the terminal 20a. Further, the storage unit 32 of the movement information registration server 30 stores registration authentication information 70 for judging whether or not authentication information to be described later is correct, in addition to the movement history 50 and the daily information 60.

Other than this point, the structure of the radio communication network 601 is the same as the radio communication network 1 according to the first and the second embodiments, so that explanations thereof are omitted. Further, the data contents of the movement history 50 and the daily information 60 are the same as those shown in FIG. 2 and FIG. 3. Furthermore, the processing regarding recording of the movement history 50 is the same as that shown in FIG. 5 or FIG. 8.

For example, while the terminal 20a that performs radio communications with the base station 10 is a mobile phone or the like, the terminal 620 that makes the movement history reference request of the terminal 20a may be a terminal that communicates with the base station 10 or may be a personal computer, a PDA, a PHS, or the like accessible to the movement information registration server 30 and the information collection server 40 via the Internet or the like. In FIG. 10, the terminal 620 is illustrated as a terminal that communicates with the base station 10.

Figure 11:
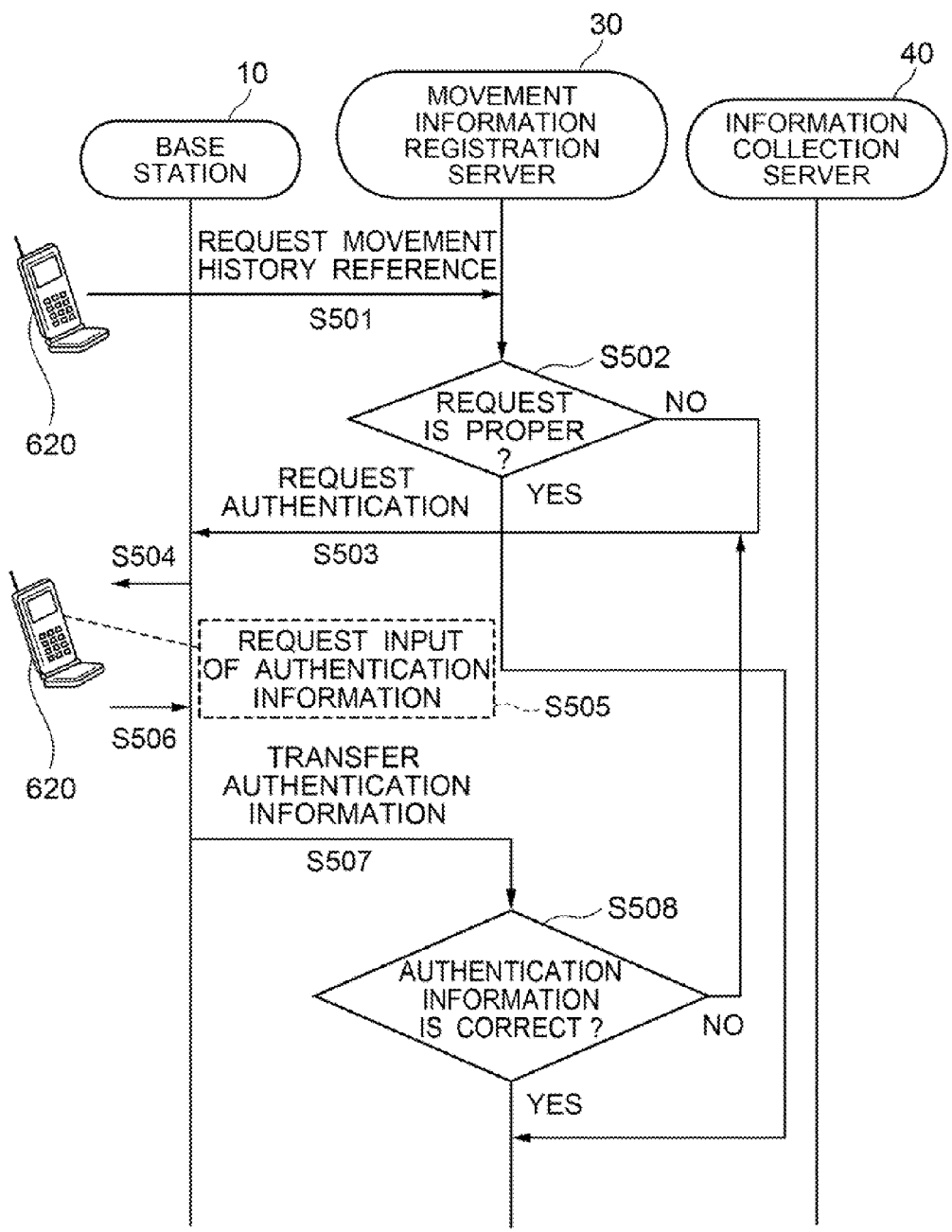
FIG. 11 is a flowchart showing the flow of processing that is executed among the base station, the movement information registration server, and the information collection server shown in FIG. 10, when there is a movement history reference request from a terminal.

FIG. 11 is a flowchart showing the flow of the processing that is executed when there is the movement history reference request of the terminal 20a made from the terminal 620 among the base station 10, the movement information registration server 30, and the information collection server 40 shown in FIG. 10. The base station 10 that has received the movement history reference request of the terminal 20a from the terminal 620 transfers the movement history reference request to the movement information registration server 30 (step S501). The movement history reference request contains the UE identification number 51 and information (request information) indicating desire to refer to the movement history of the terminal corresponding to the UE identification number 51.

The movement information registration server 30 that has received the movement history reference request from the base station 10 checks whether or not the request is proper (step S502). Note here that whether or not the request is "proper" means whether or not the UE identification number 51 as the target of the reference of the movement history is the same as that of the terminal 20a that is the transmitter of the movement history reference request in step S501. When those are the same, the movement information registration server 30 judges that it is a proper movement history reference request, and shifts the processing to the processing of step S204 of FIG. 6 and thereafter. When those are not the same, the movement information registration server 30 shifts the processing to a user authentication procedure. Here, the transmitter of the movement history reference request is the terminal 620 and it has a different UE identification number 51 from that of the terminal 20a as the reference target of the movement history, so that the movement information registration server 30 shifts the processing to step S503.

In a case where the processing is shifted to step S503, the terminal 620 cannot refer to the movement history of the terminal 20a unless it goes through the authentication procedure. Thus, the movement information registration server 30 transmits an authentication request to the base station 10 (step S503), and the base station 10 transits the authentication request as it is to the terminal 620 (step S504). The terminal 620 requests input of the authentication information to the user according to the authentication request received from the base station 10 (step S505). The authentication information herein may be a password, for example, or may be biometric information (fingerprints or the like) or electronic information (IC chip or the like).

The authentication information inputted in step S505 is transmitted to the movement information registration server 30 via the base station 10 (steps S506-7), and the movement information registration server 30 compares the authentication information with the data recorded in the registration authentication information 70 to judge whether or not it is correct (step S508). The movement information registration server 30 shifts to the processing of step S204 and thereafter of FIG. 6 when it is judged as correct. When it is not correct, the movement information registration server 30 returns to step S503 to redo the input of the authentication information. Note here that the movement information registration server 30 may be set to cancel the processing thereafter when the number of input of the authentication information that is incorrect reaches a prescribed number.

Thereby, it is possible to refer to the movement history of the terminal 20a from another terminal 620. As described above, the terminal 620 may be a device that is accessible to the movement information registration server 30 and the information collection server 40 via the Internet or the like. In that case, the base station 10 of FIG. 6 and FIG. 11 is replaced with a communication channel, a device, or the like connecting between the terminal 620 and the information registration server 30.

Various applications of the technique according to the embodiment can be considered. For example, a user having the terminal 620 can apply it to monitor behaviors of the family members of the user who has the terminal 20a. In that case, it is not only possible to acquire the behavioral history of the family member but also possible to acquire the additional information regarding each point. Thus, it is possible to know even the contents of the behaviors at each point.

In the embodiments described above, two or more servers out of the movement information registration server 30, the information collection server 40, and the additional information server 90 may of course be structured as a physically same computer as described above.

While the present invention has been described by referring to the specific embodiments shown in the drawings, the present invention is not limited only to the embodiments shown in the drawings. It is needless to mention that any known structures can be employed as long as the effects of the present invention can be achieved therewith.

INDUSTRIAL APPLICABILITY

The present invention can provide a system with which the user can refer to the movement history including the additional information based on the latest data.

REFERENCE NUMERALS

1, 601 Radio communication network
10 Base station
20a, - - - , 620 Terminal
30 Movement information registration server
31 Processing unit
32 Storage unit
33 Movement history recording unit
34 Movement history reference unit
40 Information collection server
41 Processing unit
42 Storage unit
43 Data retrieval unit
44 Address data
50 Movement history
60 Daily information
70 Registration authentication information
81 Search engine
90 Additional information server

What is claimed is:

1. A movement history reference system capable of recording and referring to movement history of a first terminal, which is structured with a base station communicating with the first terminal and a movement information registration server as well as an information collection server connected mutually to the base station, wherein:
   the movement information registration server comprises
   a first storage unit that stores the movement history,
   a movement history recording unit that acquires positional information of the first terminal from the base station, requests the information collection server to retrieve an address corresponding to the positional information and additional information related to the address, and stores the positional information and the address as well as the additional information returned from the information collection server to the movement history, and
   a movement history reference unit that retrieves a record regarding the first terminal from the movement history according to a movement history reference request from the first terminal, requests the information collection server to retrieve an address corresponding to the positional information contained in the retrieved record regarding the first terminal and the additional information related to the address, changes the address and the additional information retrieved from the movement history to the address and the additional information returned from the information collection server, and returns the changed address and the additional information to the first terminal; and
   the information collection server comprises
   a second storage unit that stores address data that is a list of addresses corresponding to the positional information, and
   a data retrieval unit that retrieves an address corresponding to the positional information from the address data, retrieves additional information related to the address, and returns the acquired address and additional information to the movement information registration server.

2. The movement history reference system as claimed in claim 1, wherein:
   the first storage unit stores daily information that is information of a place where the first terminal is considered to be at daily; and
   the movement history recording unit does not request the retrieval of the additional information to the information collection server, when a distance between a position shown by the positional information and a position shown by the daily information is equal to or less than a predetermined distance.

3. The movement history reference system as claimed in claim 1, wherein
   the movement history recording unit does not request the retrieval of the additional information to the information collection server, when a distance between a position shown by the positional information and a position shown by previously recorded information that is previous positional information stored in the movement history is equal to or less than a predetermined distance.

4. The movement history reference system as claimed in claim 1, wherein
   the movement history contains stay time information that shows time for which the first terminal continuously stays at a same position.

5. The movement history reference system as claimed in claim 1, wherein:
   the first terminal has a GPS (Global Positioning System) function; and
   the base station acquires the positional information that is acquired by the first terminal based on the GPS function.

6. The movement history reference system as claimed in claim 1, wherein
   in a case where there is a movement history reference request of the first terminal made from a second terminal, the movement history reference unit requests the second terminal to transmit authentication information and, when the authentication information transmitted from the second terminal is proper, retrieves a record regarding the first terminal from the movement history and returns the record to the second terminal.

7. The movement history reference system as claimed in claim 1, wherein:
   the address data contains information regarding an area where the address belongs; and
   the data retrieval unit returns the area corresponding to the address to the movement information registration server simultaneously with the address and the additional information.

8. The movement history reference system as claimed in claim 1, wherein
   the data retrieval unit includes a text mining module, and uses the text mining module to extract the additional information from a result of retrieval done by a search engine on the Internet by having the address as a keyword.

9. The movement history reference system as claimed in claim 1, wherein
the data retrieval unit transmits the address to an additional information server that stores the additional information corresponding to the address to acquire the additional information.

10. A movement information registration server which constitutes a movement history reference system by being mutually connected to an information collection server and a base station that communicates with a first terminal, the movement information registration server comprising:
a storage unit that stores movement history of the first terminal;
a movement history recording unit that acquires positional information of the first terminal from the base station, requests the information collection server to retrieve an address corresponding to the positional information and additional information related to the address, and stores the positional information and the address as well as the additional information returned from the information collection server to the movement history; and
a movement history reference unit that retrieves a record regarding the first terminal from the movement history according to a movement history reference request from the first terminal, requests the information collection server to retrieve an address corresponding to the positional information contained in the retrieved record regarding the first terminal and the additional information related to the address, changes the address and the additional information retrieved from the movement history to the address and the additional information returned from the information collection server, and returns the changed address and the additional information to the first terminal.

11. A movement history reference method capable of recording and making reference to movement history of a terminal in a radio communication network that is farmed with a base station communicating with the terminal and a movement information registration server as well as an information collection server connected mutually to the base station, the method comprising:
acquiring positional information of the terminal from the base station and requesting the information collection server to retrieve a first address corresponding to the positional information and first additional information related to the first address by using the movement information registration server;
retrieving the first address and the first additional information from address data stored in itself by using the information collection server;
returning the retrieved first address and first additional information to the movement information registration server by using the information collection server;
storing the positional information and the first address as well as the first additional information returned from the information collection server to the movement history by using the movement information registration server;
retrieving a record regarding the terminal from the movement history according to a movement history reference request from the terminal by using the movement information registration server;
requesting the information collection server to retrieve a second address corresponding to the positional information contained in the retrieved record regarding the terminal and second additional information related to the second address by using the movement information registration server;
retrieving the second address and the second additional information, and returning the second address and the second additional information to the movement information registration server by using the information collection server; and
changing the first address and the first additional information to the second address and the second additional information returned from the information collection server, and returning the second address and the second additional information to the terminal by using the movement information registration server.

12. A non-transitory computer readable recording medium storing movement history reference program that causes a computer, which is a movement information registration server that constitutes a movement history reference system by being mutually connected to an information collection server and a base station that communicates with a terminal, to execute:
a function of acquiring positional information of the terminal from the base station;
a function of requesting the information collection server to retrieve a first address corresponding to the positional information and first additional information related to the first address;
a function of storing the positional information and the first address as well as the first additional information returned from the information collection server to the movement history;
a function of retrieving a record regarding the terminal from the movement history according to a movement history reference request from the terminal;
a function of requesting the information collection server to retrieve a second address corresponding to the positional information contained in the retrieved record regarding the terminal and second additional information related to the second address; and
a function of changing the first address and the first additional information to the second address and the second additional information returned from the information collection server, and returning the second address and the second additional information to the terminal.

13. A movement history reference system capable of recording and referring to movement history of a first terminal, which is structured with a base station communicating with the first terminal and a movement information registration server as well as an information collection server connected mutually to the base station, wherein:
the movement information registration server comprises first storage means for storing the movement history,
movement history recording means for acquiring positional information of the first terminal from the base station, requesting the information collection server to retrieve an address corresponding to the positional information and additional information related to the address, and storing the positional information and the address as well as the additional information returned from the information collection server to the movement history, and
movement history reference means for retrieving a record regarding the first terminal from the movement history according to a movement history reference request from the first terminal, requesting the information collection server to retrieve an address corresponding to the positional information contained in the retrieved record regarding the first terminal and the additional information related to the address, changing the address and the additional information retrieved from the movement history to the address and the additional information returned from the information collection server, and returning the changed address and the additional information to the first terminal; and the information collection server comprises second storage means for storing address data that is a list of addresses corresponding to the positional information, and data retrieval means for retrieving an address corresponding to the positional information from the address data, retrieving additional information related to the address, and returning the acquired address and additional information to the movement information registration server.

14. A movement information registration server which constitutes a movement history reference system by being mutually connected to an information collection server and a base station that communicates with a first terminal, the movement information registration server comprising:

storage means for storing movement history of the first terminal;

movement history recording means for acquiring positional information of the first terminal from the base station, requesting the information collection server to retrieve an address corresponding to the positional information and additional information related to the address, and storing the positional information and the address as well as the additional information returned from the information collection server to the movement history; and movement history reference means for retrieving a record regarding the first terminal from the movement history according to a movement history reference request from the first terminal, requesting the information collection server to retrieve an address corresponding to the positional information contained in the retrieved record regarding the first terminal and the additional information related to the address, changing the address and the additional information retrieved from the movement history to the address and the additional information returned from the information collection server, and returning the changed address and the additional information to the first terminal.

* * * * *